United States Patent [19]
Rittenhouse

[11] Patent Number: 4,493,395
[45] Date of Patent: Jan. 15, 1985

[54] TREE STAND FOR HUNTERS

[76] Inventor: Raymond G. Rittenhouse, 1392 SR 41 SW., Washington Court House, Ohio 43160

[21] Appl. No.: 538,536

[22] Filed: Oct. 3, 1983

[51] Int. Cl.³ .................. A01M 31/02; A45F 3/26; A47C 9/10
[52] U.S. Cl. .................................. 182/187; 108/152
[58] Field of Search ............... 182/187, 188, 50; 108/152

[56] References Cited

U.S. PATENT DOCUMENTS

| 2,879,830 | 3/1959 | Johnson | 182/187 |
| 3,358,789 | 12/1967 | Laun | 182/187 |
| 3,568,797 | 3/1971 | Hardy | 182/187 |
| 3,871,482 | 3/1975 | Southard | 182/187 |
| 3,990,536 | 11/1976 | Wilburn | 182/187 |
| 4,120,377 | 10/1978 | Charles | 182/50 |
| 4,120,379 | 10/1978 | Carter | 182/187 |
| 4,134,474 | 1/1979 | Stavenau | 182/187 |
| 4,205,733 | 6/1980 | Wade | 182/187 |
| 4,230,296 | 10/1980 | Staley | 182/187 |
| 4,331,216 | 5/1982 | Amacker | 182/187 |

Primary Examiner—Reinaldo P. Machado

[57] ABSTRACT

This tree seat is designed for hunters, for ease of carrying, and effortlessly enables its user to elevate himself and the seat up a tree. Primarily, it consists of a folding frame, having a platform and a folding hammock seat. It also includes a safety belt, a tree belt, gun and bow supports, and a block and tackle for its elevation and descent.

1 Claim, 7 Drawing Figures

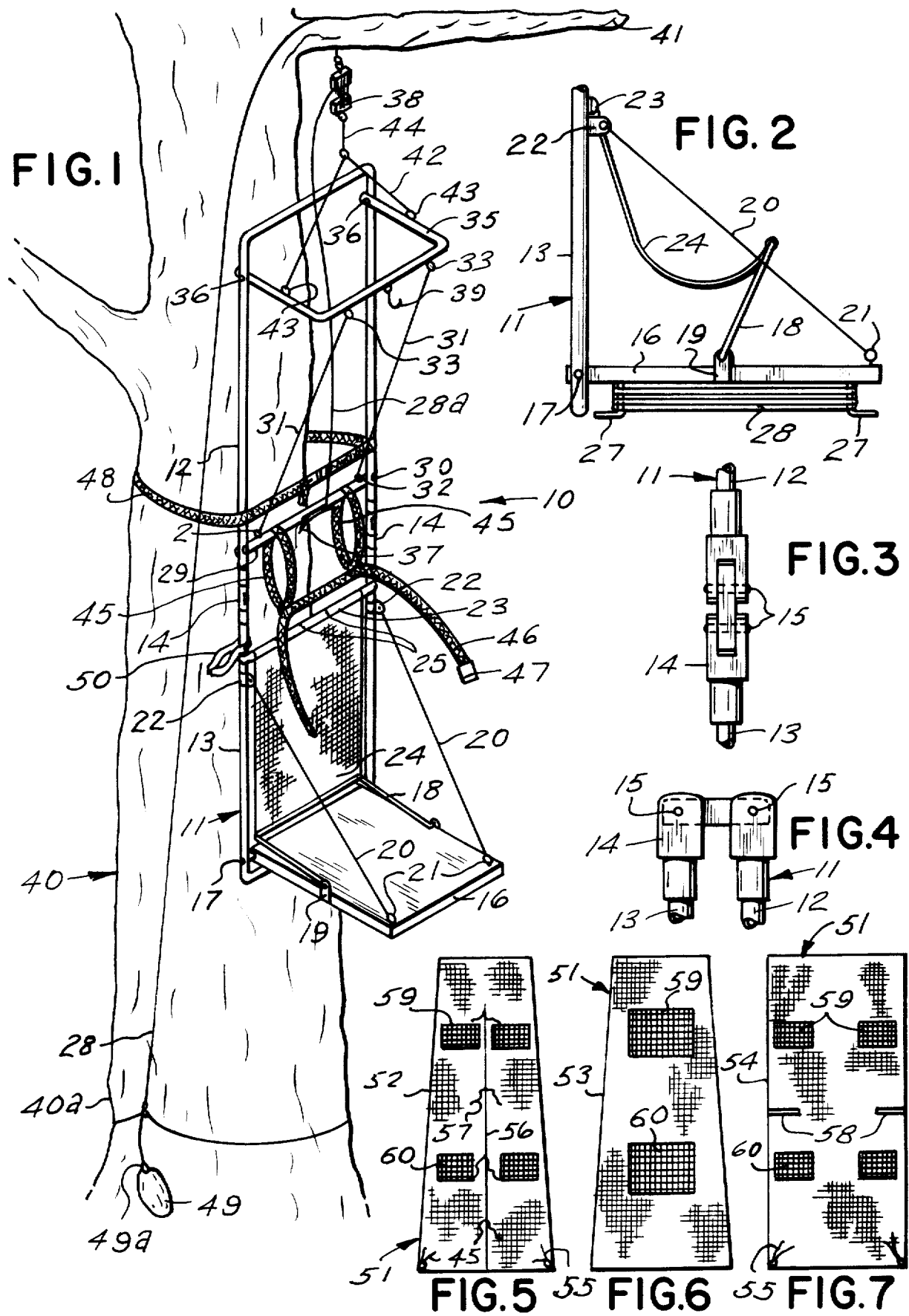

TREE STAND FOR HUNTERS

This invention relates to devices for hunters, and more particularly, to a tree stand for hunters.

The principal object of this invention is to provide a tree stand for hunters, which will elevate a hunter from eight to ten feet from the ground level, so as to prevent deer from getting the hunter's scent, as he waits for a deer.

It is well known in the art, that, when hunting deer, the hunter has to outsmart them, because deer are the smartest animals in the woods, and therefore, the hunter needs all of the advantages he can obtain.

Another object of this invention is to provide a tree stand for hunters, which will enable a deer hunter to sit comfortably in a hammock seat, and the stand will also enable the hunter to have a seventy-five percent greater chance of getting a deer.

Another object of this invention is to provide a tree stand for hunters, which will be an improvement over tree stands of the prior art, because such stands on the market today, known as self-climbers, will not afford the advantages of the present invention. With the above-type stands, the hunter must climb with one part in his hands, and use his feet to pull up on the other part, and they are very hard to use. By the time the hunter reaches the upper portion of the tree, he is soaking with perspiration and is physically worn out, and when the hunter gets to the large woods and finds a trail, usually the trees are too large, and the limbs are too high and large in diameter, for the abovementioned stands of the art.

A further object of this invention is to provide a tree stand for hunters, which will be completely safe in use.

Other objects are to provide a tree stand for hunters, which is simple in design, inexpensive to manufacture, rugged in construction, easy to use, and efficient in operation.

These, and other objects, will be readily evident, upon a study of the following specification, and the accompanying drawing, wherein:

FIG. 1 is a perspective view of the present invention;

FIG. 2 is an enlarged fragmentary side elevational view of the invention, showing the line stored thereon;

FIG. 3 is a vertical and fragmentary elevational view of a portion of the invention, showing the hinge in open condition;

FIG. 4 is a side view of FIG. 3, and illustrates the hinge in folded condition;

FIG. 5 is a front elevational view of the protective weather cover for the invention;

FIG. 6 is a side view of FIG. 5, and

FIG. 7 is a rear view of FIG. 5.

Accordingly, a tree stand 10 is shown to include an aluminum tubing frame 11, which is composed of an upper "U"-shaped member 12, and a lower "U"-shaped member 13. Members 12 and 13 are coupled together by a pair of hinges 14, which are pivotally secured to the ends of members 12 and 13, by pins 15. A plywood platform 16 is pivotally secured, at its rear end, between the lower confines of member 13, by suitable bolts 17 with a step bracket (not shown). A stainless steel bar 18, of "U"-shaped configuration, is pivotally secured, at its ends, to a pair of brackets 19, which are fixedly secured to the sides of platform 16, by suitable means, (not shown). A pair of cables 20, with a sealed loop on each end, which are not shown, are secured to a pair of eyes 21, that are fixedly secured to the top front of platform 16. The opposite ends of cables 20 are similarly secured to a pair of brackets 22, which are fixedly secured to the lower "U"-shaped member 13 of frame 11, and cables 20 serve to support platform 16 in its horizontally extended position. A brace bar 23 is welded, at each end, to the side portions of member 13, and a canvas panel 24 is secured around bar 18 at one end, and is wrapped around brace bar 23 at its opposite end, where it is fastened by suitable screws 25, and washers, (not shown). The panel 24 serves as a comfortable seat rest for platform 16, when bar 18 is pivoted, as illustrated in FIG. 2, and a pair of oppositely opposed metal cleats 27 are fixedly secured to the bottom of platform 16, and serve as a means of storing rope or line 28. An aluminum bracket 29 is fixedly secured to member 12, by suitable fasteners 30 at each end, and one end of a pair of cables 31 are fastened to a pair of eyes 32, which are fixedly secured to bracket 29. The opposite ends of cables 31 are similarly secured to eyes 33, which are fixedly secured to the center portion of a "U"-shaped counter-balance bar 35, pivotally secured, at each end, to the upper portion of member 12 of frame 11, by suitable fasteners 36. A double ended cleat 37 is fixedly secured to the front of bracket 29 by suitable fasteners, (not shown), and serves to tie to the block and tackle 38 line 28a. A "J" bracket 39 is secured to the front of counter-balance bar 35, in a suitable manner, (not shown), and bracket 39 serves to hang a hunting bow on, and it shall be noted, that line 28a serves as a means by which the hunter may pull himself up the tree 40, when the block and tackle is suspended from the limb 41 thereof. A cable 42 is suitably fastened, at each end, to eyes 43, which are fixedly secured to the top of the side portions of counter-balance bar 35, and cable 42 includes a steel ring 44, that is fastened to the end of block and tackle 38. A pair of belts 45, of the web type, are looped around the bracket 29, and include steel rings, which receive a nylon safety belt 46, having a buckle 47. A tree securement belt 48 is also provided, which loops around frame 11 of stand 10 and tree 40, so as to be pulled tight, to keep tree stand 10 steady in position. The nylon line 28 includes a bag 49 on one end, and serves to support the block and tackle 38 over limb 41, by being secured about the lower portion of the trunk 40a. The bag 49 encloses a pound of lead shot, and is fastened to line 28 by its eye 49a, so as to be used to toss line 28 over limb 41 of tree 40. A shotgun or rifle holder is also provided, and it consists of a clamp 50, which is adjustable in elevation, and is secured by suitable fastening means to one side of member 13 of frame 11. The clamp 50 further includes a spring loaded hard rubber member, (not shown), which fits around the gun barrel, to render it secure until the hunter wants it. The clamp 50 also extends outward of frame 11, enabling the butt to rest on top of platform 16.

A canvas shelter 51 is also provided, to protect the hunter from inclement weather, should the need arise, and both the tree stand 10 and the shelter 51 are painted with a suitable camouflage paint, so as to blend into the natural surroundings of the woods.

It shall also be noted, that the hinges 14 of frame 11 are very tight, frictionally in structure, so as to enable frame 10 to remain in its extended or unfolded condition when in use, and shelter 51 is tapered to fit stand 10. The shelter 51 includes a front panel 52, a pair of side panels 53, and a rear panel 54. Shelter 51 is full length, and includes tie-down straps 55, for fastening its lower end to platform 16, and a slit 56, in front panel 52, is provided with straps 57, so as to enable the hunter to tie it together, or tie it back alongside, out of the hunter's way. The rear panel 54 includes a pair of spaced slots 58, which enables belt 48 to extend through, and each of the panels 52, 53, and 54 includes upper nylon screen windows 59, for the hunter to see out when he is standing, and lower, similar windows 60, so as to enable the hunter to see out when he is sitting on canvas panel 24. The windows further include black tie-down flaps on the inside, to cover them when desired, and the whole shelter 51 is noiseless when handled.

In use, stand 10 is placed against a sturdy tree 40, which must be fairly straight and having a limb 41, approximately fifteen to twenty feet from the ground. The belts 46 and 48 are then taken from around stand 10, and the lines 28 and 28a unwound from the cleats 27, after which, platform 16 is pivoted downward in frame 11. Care should also be taken to keep line 28 on one side, and line 28a on the other side of the stand 10. The block and tackle 38 is then unhooked from eyes 21, where it is stored. The bag 49 is then taken, and with a little slack in its line 28, it is thrown up and over limb 41, where it falls to the ground. Line 28 is hooked to block and tackle 38, and the slack is taken out of line 28, until counter-balance bar 35 is horizontal to bracket 29. The hunter then steps onto platform 16, and starts pulling on line 28, which will cause the top of block and tackle 38 to ascend the tree 40, until the desired height is obtained. After the abovementioned, the hunter then takes the portion of line 28 which he is holding, and ties it to a nearby tree, tree 40, or something strong enough to hold stand 10 safely. After the above, and standing behind tree 40, the hunter grasps line 28a, and pulls the stand to its upright position, but not off the ground. Line 28a is then tied to cleat 37, temporarily, and the frame 11 is straightened. The hunter then steps on platform 16, and with his back to frame 11, he puts belt 46 around himself, and pulls it tight. Belt 48 is then looped over bracket 29, temporarily, after which, line 28a is untied from cleat 37, and the hunter pulls himself and the tree stand up tree 40 to the desired height. (However, it is not recommended that the hunter ascend more than ten feet from the ground). Line 28a is then tied to cleat 37, by looping it around several times, and then knotting it twice for safety. After the above, the hunter takes belt 46 and throws it around tree 40, and loops each end around frame 11, and buckles it, after pulling it tight. For comfortable seating, the hunter rotates bar 18 upwards, so as to enable him to sit on the hammock seat, which comprises the canvas panel 24.

When the hunter wishes to stand up, all he has to do is to pivot bar 18 rearwards and down, and with the safety belt 46, the hunter may lean out from tree 40 for a better bow or gunshot. In letting himself down to the ground, the hunter removes belt 48 from around the tree 40, and while holding line 28a in one hand, he unties line 28a from cleat 37, and slowly descends to the ground.

While various changes may be made in the detail construction, it is understood that such changes will be within the spirit and scope of the present invention, as is defined by the appended claims.

What I now claim is:

1. A tree stand for hunters, comprising, in combination, a frame, a plywood platform secured to said frame, a canvas seat attached to said frame, a safety belt secured to said frame, a block and tackle suspension unit attached to said frame, a tree securement belt looped around said frame, and a bow support device and a long gun support device secured to said frame; said frame including a pair of "U"-shaped, tubular members pivotally attached together by hinges and forming an upper and a lower portion, said platform being pivotally secured within said lower portion of said frame by pivot pin means, said seat being foldable above said platform and being secured, at one end, to a pivotable bar secured to said platform, and an opposite end of said seat is fixedly secured to a cross bar welded to said lower portion of the frame; and said suspension unit is attached to said upper portion of the frame and includes weight means for attaching said tree stand around a tree limb.

* * * * *